United States Patent [19]

Okamoto

[11] Patent Number: 4,945,270
[45] Date of Patent: Jul. 31, 1990

[54] MOISTURE DRAIN STRUCTURE FOR A DYNAMOELECTRIC MACHINE AND MANUFACTURING METHOD THEREFOR

[75] Inventor: Kyoichi Okamoto, Himeji, Japan

[73] Assignee: Mitsubishi Denki Kabushiki Kaisha, Japan

[21] Appl. No.: 265,810

[22] PCT Filed: Feb. 10, 1988

[86] PCT No.: PCT/JP88/00135

§ 371 Date: Oct. 11, 1988

§ 102(e) Date: Oct. 11, 1988

[87] PCT Pub. No.: WO88/06368

PCT Pub. Date: Aug. 25, 1988

[30] Foreign Application Priority Data

Feb. 13, 1987 [JP] Japan .................................. 20164

[51] Int. Cl.⁵ ...................... H02K 5/00; H02K 15/14
[52] U.S. Cl. .................................. 310/88; 310/42; 310/89; 29/596
[58] Field of Search .............. 310/88, 89; 417/437; 220/DIG. 6; 312/229; 29/523, 596

[56] References Cited

U.S. PATENT DOCUMENTS

| | | | |
|---|---|---|---|
| 4,336,473 | 6/1982 | Wetters et al. | 310/88 |
| 4,491,754 | 1/1985 | Gotoh | 310/88 |
| 4,808,871 | 2/1989 | Morishita et al. | 310/43 |

FOREIGN PATENT DOCUMENTS 3143000 5/1983 Fed. Rep. of Germany .
3305297 8/1984 Fed. Rep. of Germany .

Primary Examiner—Peter S. Wong
Assistant Examiner—C. E. LaBalle
Attorney, Agent, or Firm—Leydig, Voit & Mayer

[57] ABSTRACT

A moisture drain structure for an engine starter motor comprises a drain conduit integrally formed on a rear bracket of a housing to define therein a drain channel. The interior and the exterior of the housing communicate through the drain in the bracket which is formed at the same time a channel and spigot joint element is machined and which is located at the thinly machined portion of the spigot joint of the rear bracket. A method for manufacturing the moisture drain structure is also disclosed.

4 Claims, 2 Drawing Sheets

MOISTURE DRAIN STRUCTURE FOR A DYNAMOELECTRIC MACHINE AND MANUFACTURING METHOD THEREFOR

INDUSTRIAL FIELD

This invention relates to a moisture drain structure for a dynamoelectric machine and a manufacturing method therefor and, more particularly, to a moisture drain structure for an electric motor of an engine starter and a manufacturing method therefor.

BACKGROUND ART

FIG. 1 illustrates one example of a moisture drain structure disposed at the rear portion of an engine starter motor. The starter motor illustrated in FIG. 1 comprises a d.c. motor armature 1 having a rotary shaft 2, an armature core 3 mounted on the rotary shaft 2 and a commutator 4 mounted on the rotary shaft 2. The starter motor also comprises a housing 5 including a magnetic yoke 6 and an end or rear bracket 7 connected to the magnetic yoke 6 by a well-known spigot joint structure 8. The end bracket 7 has brush assemblies 9 secured on its inner end surface by bolts 10 so that the brush assemblies 9 are maintained in a sliding pressure contact relationship with the commutator 4. The end bracket 7 also supports a bearing 11 which rotatably supports one end of the rotary shaft 2 of the armature 1.

In order to drain moisture captured within the motor housing 5, the startor motor 1 is also provided with a drain tube 12 inserted into a through hole 13 formed in the bottom rear end of the housing 5 of the startor motor 1. The illustrated drain tube 12 is made of rubber and has on the inner surface thereof a labyrinth structure 14 for preventing the ingress of moisture from below. The drain tube 12 is held in the hole 13 by a flange 15 formed at one end thereof.

According to the above-described moisture drain structure of the conventional design, the through hole 13 must first be formed in the rear bracket 7, and then the rubber drain pipe 12 must be inserted from the interior of the bracket 7. Thus, during the manufacture of the dynamoelectric machine, in addition to machining the rear bracket 7 for the spigot joint 8, the machining of the bracket 7 for the moisture drain through hole 13 must be done by a reamer or the like. Also, the rubber drain tube 12, which is a separate part, must be assembled into the through hole 13. Therefore, the number of manufacturing steps and the number of parts are relatively large, resulting in relatively high cost.

DISCLOSURE OF INVENTION

Accordingly, an object of the present invention is to provide a moisture drain structure for a dynamoelectric machine that can be easily manufactured at low cost.

Another object of the present invention is to provide a method for manufacturing a moisture drain structure for a dynamoelectric machine that allows the easy and quick manufacture of the moisture drain structure at low cost.

According to the moisture drain structure for a dynamoelectric machine of the present invention, the housing of the dynamoelectric machine includes a spigot joint for connecting housing sections. The spigot joint includes at least two joint elements which are thinly machined portions of the housing section walls to be overlapped with each other. The rear bracket of the motor housing section has a moisture drain conduit formed integrally with the bottom wall of the housing by casting, for example. The moisture drain conduit extends substantially along the outer surface of the housing and defines therein a moisture drain channel through which the moisture within the housing drains. One end of the moisture drain conduit is open in the axial direction of the motor. The other end is closed in the axial direction but is communicated with the interior of the housing through a hole which is formed in the spigot joint element of the housing. The top wall of the moisture drain channel is defined by the housing wall. The top wall surface of the drain channel is not on the same plane in which the outer surface of the housing wall lies, but is located above the plane including the housing outer surface by a distance at least equal to the thickness of the spigot joint element of that housing section.

According to the moisture drain structure of the present invention, the drain conduit communicates through a hole which is formed during machining for forming the spigot joint and which is located at the machined, thin joint element of the spigot joint of the rear bracket. Therefore, the forming of the moisture drain hole in the rear bracket is achieved concurrently with the machining of the rear bracket for forming the spigot joint, reducing the number of steps in manufacture. Also, since the moisture drain conduit is integrally formed with the rear bracket of the motor housing, the number of parts to be assembled is decreased as compared to that of the conventional design.

The method for manufacturing a moisture drain structure of the present invention comprises the steps of: preparing a housing section having a moisture drain conduit integral with said housing section, said moisture drain conduit defining therein a moisture drain channel extending substantially horizontally along the housing wall, said drain channel having a top wall surface defined by the housing wall which is located above a plane including the housing outer surface by a distance at least equal to the thickness of the spigot joint element of the housing section; machining said housing section to remove an inner surface portion of said housing section by a thickness sufficient to form a first spigot joint element therein and to form a through hole communicating said moisture drain channel with the interior of the housing; machining the other of the housing sections to form a second spigot joint element to be coupled to said first spigot joint element; and connecting said housing sections together through the use of said spigot joint.

BRIEF DESCRIPTION OF DRAWINGS

The present invention will become more readily apparent from the following detailed description of the invention taken in conjunction with the accompanying drawings, in which.

BEST MODE FOR CARRYING OUT THE INVENTION

Figure 1:
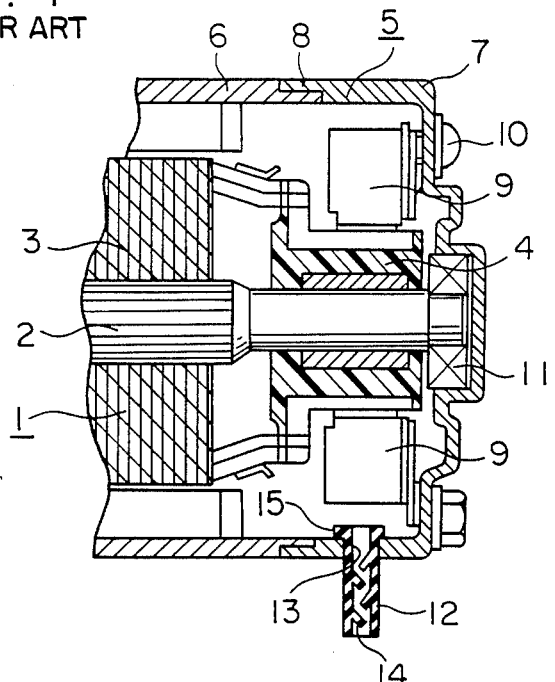
FIG. 1 is a fragmental sectional view showing the moisture drain structure of a conventional design.
Figure 2:
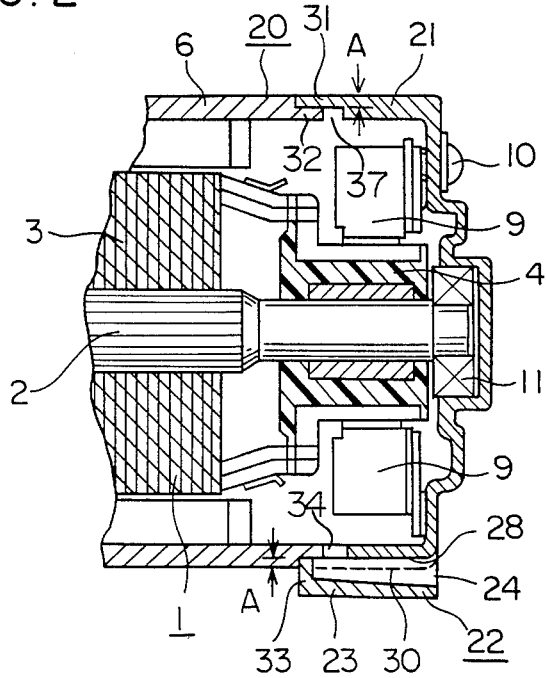
FIG. 2 is a fragmental sectional view showing the moisture drain structure of the present invention.

FIG. 2 illustrates the moisture drain structure of the present invention as being applied to an engine starter motor. The basic structure of the starter motor shown in FIG. 2 to which the moisture drain structure of the present invention is applied is the same as that of the conventional motor illustrated in FIG. 1, so that the description of the motor structure will not be repeated.

According to the present invention, the motor housing 20 comprises housing sections such as the magnetic yoke 6 and a rear bracket 21. The basic structure of the rear bracket 21 is the same as the rear bracket 7 shown in FIG. 1, but is different in terms of the moisture drain structure 22. As seen from FIGS. 2 to 6, the rear bracket 21 has a moisture drain conduit 23 integrally formed by die-casting, for example, on the outer surface of the cylindrical wall of the rear bracket 21.

The illustrated moisture drain conduit 23 extends substantially along the cylindrical outer surface of the rear bracket 21 and defines therein a moisture drain channel 24 through which the moisture within the housing drains. In the illustrated embodiment, the drain channel 24 has a substantially rectangular cross section and is defined by two side walls 25, 26 and a bottom wall 27 of the moisture drain conduit 23 of a substantially U-shaped cross section and a top wall 28 which is the outer surface of a part of the cylindrical wall 29 of the rear bracket 21. It is to be noted that the top wall surface 28 of the drain channel 24 is not on a cylindrical plane 30 which includes the outer surface of the cylindrical wall 29 of the rear bracket 21, but is located inside of it by a distance at least equal to the thickness A of an outer spigot joint element 31 which engages an inner spigot joint element 32 on the magnetic yoke 6.

One end of the drain channel 24 defined by the moisture drain conduit 23 is open in the direction of axis of the motor 10 at the end face of the rear bracket 21. The other end of the drain channel 24 is closed by an end wall 33 in the axial direction but is communicated with the interior of the housing 20 through a hole 34 formed in a thinly machined portion of the spigot joint or the outer joint element 31 of the rear bracket 21. It is seen from the figures that the hole 34 is formed at the intersection of the drain channel 24 and the spigot joint element 31 of the rear bracket 21. The top wall 28 of the drain channel 24 is removed by an amount sufficient to expose the drain channel 24 as seen from the interior of the bracket 21 when the inner surface portion of the cylindrical wall 29 of the bracket 21 is removed to form the outer spigot joint element 31.

It is also seen from FIG. 2 that the axial length of the inner spigot joint element 32 of the magnetic yoke 6 is shorter than the outer spigot joint element 31 of the rear bracket 21. Therefore, an annular groove 37 (FIG. 2) is defined between the two spigot joint elements 31 and 32, so that the through hole 34 is not completely closed by the inner spigot element 32. Alternatively, the axial dimension of the spigot joints 31 and 32 may be made equal to each other and a notch may be provided at the position corresponding to the drain channel 24.

Figure 3:
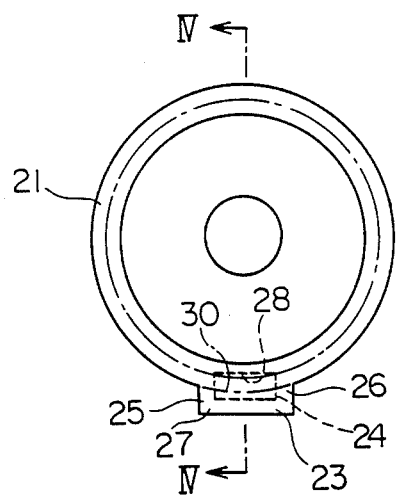
FIG. 3 is a front view of the rear bracket according to the present invention.
Figure 4:
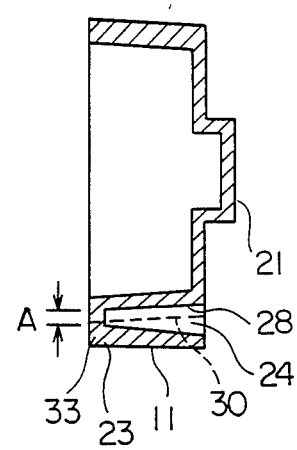
FIG. 4 is a sectional side view taken along line IV—IV of FIG. 3.
Figure 5:
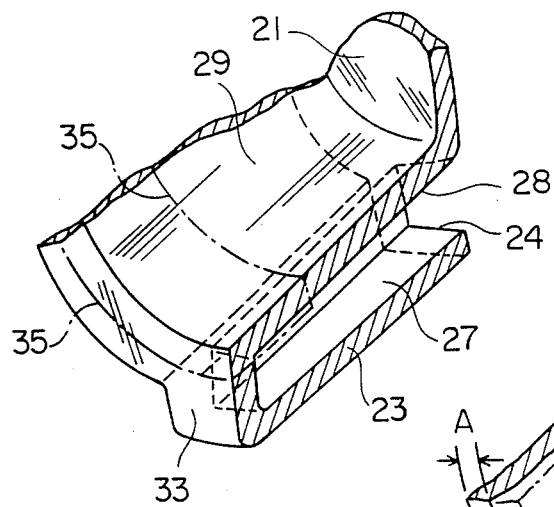
FIG. 5 is a fragmental cut-away perspective view of the rear bracket showing the moisture drain structure of the present invention before the spigot joint is formed.
Figure 6:
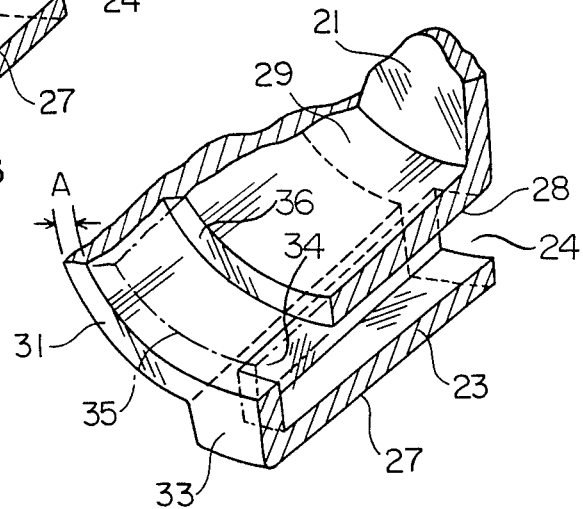
FIG. 6 is a view similar to FIG. 5 but illustrating the moisture drain structure after the spigot joint and the through hole are formed.

In order to manufacture the moisture drain structure 22 of the present invention, the rear bracket 21 as shown in FIGS. 3 to 5 is first prepared by aluminium die casting, for example. Then, an annular portion shown by a dot-and-dash line 35 in FIG. 5 on an inner edge of the cylindrical wall 29 of the rear bracket 21 is removed by machining to form an annular step 36 which defines the outer spigot joint element 31 as illustrated in FIGS. 2 and 6. Since the radial dimension of the annular step 36 or the thickness of the removed portion 35 is at least equal to the thickness of the cylindrical wall 29 of the rear bracket 21 at the position corresponding to the drain channel 24 within the drain conduit 23, the opening 34 is formed at the crossing position where the moisture drain channel 24 defined by the drain conduit 23 crosses the machine removed portion 35 when forming the outer spigot joint element 31.

As has been described, according to the moisture drain structure of the present invention, the drain conduit communicates through a hole which is formed during machining for forming the spigot joint and which is located at the machined, thin joint element of the spigot joint of the rear bracket. Therefore, the forming of the moisture drain hole in the rear bracket is achieved concurrently with the machining of the rear bracket for forming the spigot, reducing the number of steps in manufacture. Also, since the moisture drain conduit is integrally formed with the rear bracket of the motor housing, the number of parts to be assembled is decreased as compared to that of the conventional design.

I claim:

1. A moisture drain structure for a dynamo-electric machine having a housing comprising:
   a first housing section having an outer spigot joint element including an internally reduced thickness portion of said first housing section, and a second housing section having an inner spigot joint element including an externally reduced thickness portion;
   a moisture drain conduit integral with a bottom wall of said first housing section and defining therein a moisture drain channel extending substantially horizontally along the bottom wall, a first end of the drain channel extending into and in communication with an inner surface of the internally reduced thickness portion of said outer spigot joint element, and a second end of the drain channel being open to the exterior of the housing;
   the inner spigot joint element having an axial dimension shorter than the outer spigot joint element at least at a position corresponding to the first end of the drain channel.

2. A moisture drain structure as claimed in claim 1 wherein the drain channel has a top wall surface defined by the housing bottom wall extending substantially parallel to an outer surface of the housing and located above a plane including the housing outer surface by a distance at least equal to the thickness of the outer spigot joint element of the first housing section.

3. A housing for a dynamoelectric machine comprising:
   first and second housing sections having, respectively, outer and inner spigot joint elements for joining said first and second housing sections by a spigot joint, the inner spigot joint element being shorter than the outer spigot joint element to produce an inner groove in the spigot joint, said first housing section having a bottom wall; and
   a drain conduit formed integral with the bottom wall of said first housing section, said drain conduit having an end open to the outside of the housing and defining therein a moisture drain channel having a first end at the open end of the drain conduit and a second end meeting the inner groove of the spigot joint inside the housing, whereby moisture flows from the inside of the housing through the inner groove and the moisture drain channel to the outside of the housing.

4. A method for manufacturing a moisture drain structure for a dynamoelectric machine housing comprising:

preparing a first housing section having a bottom wall and moisture drain conduit disposed outside the bottom wall and integral with the first housing section, and preparing a second housing section having a housing outer surface, the moisture drain conduit defining therein a moisture drain channel extending substantially horizontally along the bottom wall, the drain channel having a top wall surface defined by the bottom wall, the top wall surface being located above a plane including the housing outer surface of the second housing section by a distance at least equal to the thickness of a first spigot joint element to be formed on the first housing section;

machining the first housing section to remove an inner surface portion of the first housing section by a thickness sufficient to form the first spigot joint element therein and to form a through hole communicating the moisture drain channel with the interior of the housing;

machining the second housing section to form a second spigot joint element to be coupled to the first spigot joint element to form a spigot joint; and connecting the housing sections together through the use of the spigot joint.

* * * * *